No. 750,112. PATENTED JAN. 19, 1904.
G. W. KING.
SPRING DRAFT ATTACHMENT.
APPLICATION FILED OCT. 30, 1903.
NO MODEL.

WITNESSES
Jos. A. Ryan
Edw. W. Byrn.

INVENTOR
George W. King.
BY
Munn & Co.
ATTORNEYS

No. 750,112. Patented January 19, 1904.

UNITED STATES PATENT OFFICE.

GEORGE W. KING, OF WASHINGTON, DISTRICT OF COLUMBIA.

SPRING DRAFT ATTACHMENT.

SPECIFICATION forming part of Letters Patent No. 750,112, dated January 19, 1904.

Application filed October 30, 1903. Serial No. 179,126. (No model.)

*To all whom it may concern:*

Be it known that I, GEORGE W. KING, a citizen of the United States, and a resident of Washington, (Georgetown,) in the District of Columbia, have made certain new and useful Improvements in Spring Draft Attachments, of which the following is a specification.

The value of a spring tension in a draft attachment has long been recognized as relieving the jar or jerk of the pulling strain on the horse's shoulders and enabling the team to steadily strain to the load in starting, as well as avoid damaging strains on the harness and vehicle. A simple form of such spring draft attachment is shown in my Patent No. 230,554, dated July 27, 1880, in which a bowed spring was provided with eyelets or keepers at its ends, through which the trace was passed, so that the trace would lie upon the convex side of the bowed spring and when the draft strain was applied to the trace the trace would in straightening out flatten the bowed spring, and thus maintain a tension in the draft attachment. An objection to this device is that it cannot receive traces that are wider than the eyelets and a narrower trace than the eyelet would not occupy a middle position on the spring, so that such device had no range of adaptability to traces of different widths. Furthermore, as the more or less stiff trace had to be laced or extended endwise through the eyelets or keepers it was troublesome to apply and remove the same, which frequently became necessary—as, for instance, when the traces are to be folded and tied up. My present invention is an improvement upon that former device designed to obviate all of these difficulties and to provide at the same time a simpler and lighter device; and to that end it consists in the novel construction and arrangement of spring draft attachment which I will now proceed to describe with reference to the drawings, in which—

Figure 1:
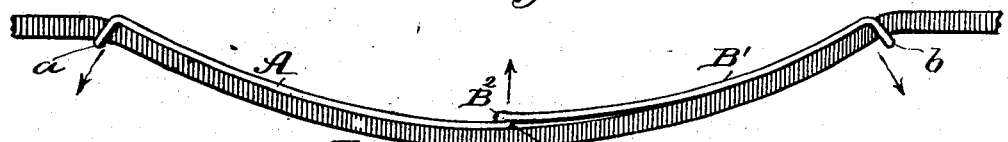
Figure 2:
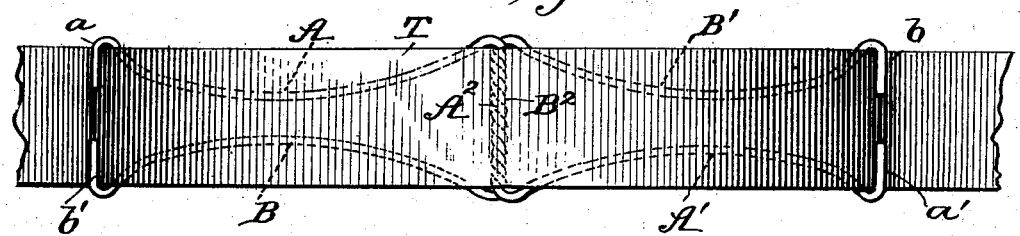
Figure 3:
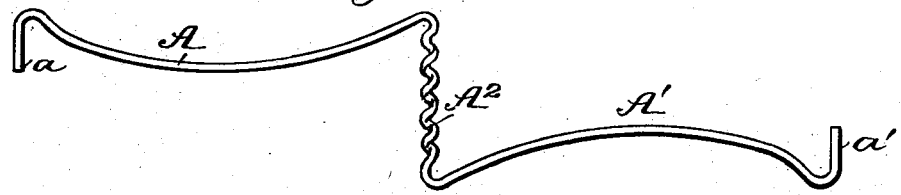
Figure 4:
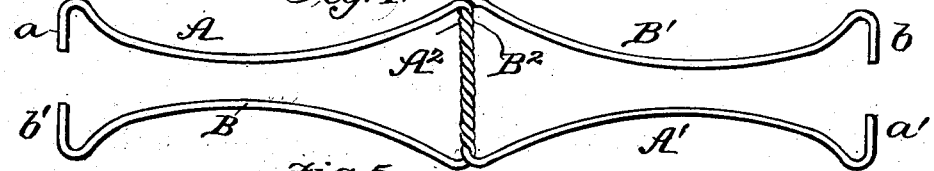
Figure 5:
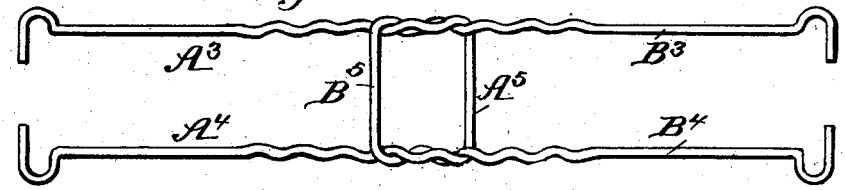
Figure 6:
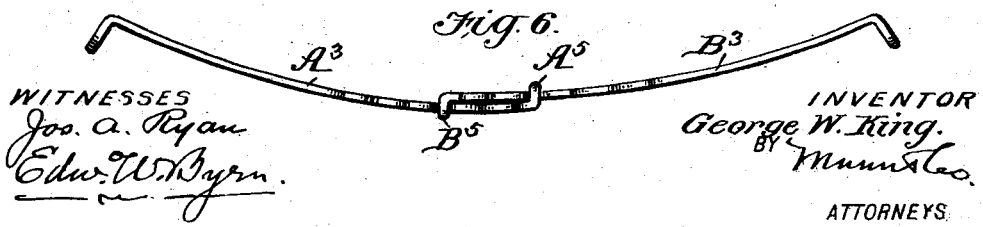

Figure 1 is a top edge view of the device shown applied to the trace. Fig. 2 is an outer side view of the same. Fig. 3 shows a detail side view of one of the spring members of the device. Fig. 4 shows a side view of the two members connected, and Figs. 5 and 6 are respectively a side and edge view of a modified form of the device.

In the drawing Fig. 4, A B A' B' represent four spring-arms of wire, which have at their outer ends hooks $a$ $b$ and $a'$ $b'$. These spring-arms are made in pairs in one continuous piece, as shown in Fig. 3, the upper spring-arm A on one side being formed in one piece with the lower spring-arm A' on the other side and with the middle portion $A^2$ formed into a transverse spiral spring. The arms B and B' are formed in the same way, and the middle transverse spiral spring $B^2$ is intertwined with the spring $A^2$ of the other pair to form a double transverse spiral spring, as shown in Fig. 4. The arms A B A' B' are bowed, as shown in Fig. 1, and the terminal hooks $a$ $b$ $a'$ $b'$ are offset to one side and made to extend over and embrace the trace T, the trace being arranged on the convex side of the bow, as seen in Figs. 1 and 2. When so applied, the draft strain on the trace tends to flatten out the bow of the spring, the middle part moving inwardly and the ends outwardly, as shown by the arrows in Fig. 1. This, it will be seen, maintains an elastic tension for the trace and yet does not involve any damaging strain on the spring, since when the latter is flattened out the trace then carries all of the draft strain.

In applying the spring to the trace the spring is applied laterally to the trace, and the two arms A B on one side and A' B' on the other side are sprung apart and are then allowed to spring together upon the edges of the trace at any point along its length without having to project the trace endwise through the same. It will also be seen that the yielding movement of A and B to and from each other and A' and B' to and from each other will make them conform to and accurately fit and closely hold a trace of any width without looseness, thus holding the trace in the exact middle line of the spring irrespective of the width of the trace. This method of applying it also allows it to be quickly and conveniently removed or applied without even unhitching the trace from the swingletree. The spring tension is supplied not only by the bow of the spring-arms, but by the double interlocked transverse spiral spring portions $A^2 B^2$, which will permit the spring-arms A B A' B' to be made quite stiff and nearly or quite rigid, if desired.

As a modification of my invention the bowed spring may be made adjustable in its length, so as to vary the tension or to fit in special situations where only a certain length is permissible. Such a construction I have shown in Figs. 5 and 6, in which the spring-arms $A^3$ $A^4$ on one side are made in one piece, with a bend or loop $A^5$ at the inner end, and the spring-arms $B^3 B^4$ on the other side are made in one piece, with a bend or loop $B^5$ at the inner end. These loops $A^5$ and $B^5$ are reciprocally interlocked, as shown, and the two pairs of arms have a longitudinal adjustment over each other, so as to increase or diminish the length of the bow-spring at will. To hold them to their adjustment, the arms are crimped, corrugated, or waved, and in making the adjustment the two arms of each pair are sprung toward each other to separate the crimps or corrugations.

My invention is adapted to be used with any ordinary flexible trace and to be attached and removed with ease and without affecting the capacity of the trace to perform its functions in the ordinary way when the spring is detached.

The operation of this improvement is that of a draft-spring to favorably modify by its elasticity all irregularities of action, receiving with safety sudden shocks and blows which might otherwise injure the animal, load, harness, or vehicle. The spring is subject to no more strain than is sufficient to counterbalance its resistance to compression, the remaining strain being confined to the trace and other connections. In case of breakage of the spring the accident would not involve the separation of the draft connections.

The advantages of this spring for the purpose intended are its simplicity, its cheapness of construction, its light weight, its ornamental character, and its adjustability to all sizes of trace and conditions of use.

Having thus described my invention, what I claim as new, and desire to secure by Letters Patent, is—

1. A draft attachment, consisting of two pairs of bowed spring-arms having free ends and hooks at their ends adapted to embrace the trace, whereby the two arms on each side have a spring action to and from each other as well as a spring action toward a straight longitudinal line, substantially as described.

2. A draft attachment, consisting of two pairs of bowed arms having hooks at their ends adapted to embrace the trace and having in the middle a transverse spiral spring substantially as described.

3. A draft attachment, consisting of two pairs of bowed arms, having hooks at their ends adapted to embrace the trace, the upper spring-arm on one side being made continuous with the lower spring-arm on the other side and bent in the middle to form a transverse spiral spring, and the two spring members being interlocked in the middle to form a double spiral spring, substantially as described.

GEORGE W. KING.

Witnesses:
EDW. W. BYRN,
SOLON C. KEMON.